United States Patent
Babu B R et al.

(10) Patent No.: US 10,191,780 B1
(45) Date of Patent: Jan. 29, 2019

(54) MASS MIGRATION OF DESKTOP DEPLOYMENTS TO VIRTUAL DESKTOP INFRASTRUCTURES

(71) Applicant: VMware, Inc., Palo Alto, CA (US)

(72) Inventors: Raghavendra Babu B R, Bangalore (IN); Sivaprasad K. Govindankutty, Bangalore (IN); Noble Peter Aranjani, Thrissur (IN)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 15/711,283

(22) Filed: Sep. 21, 2017

Related U.S. Application Data

(63) Continuation of application No. 12/945,507, filed on Nov. 12, 2010, now Pat. No. 9,785,478.

(51) Int. Cl.
  *G06F 9/50* (2006.01)
  *G06F 17/30* (2006.01)
  *G06F 3/06* (2006.01)
  *G06F 9/455* (2018.01)
  *H04L 29/08* (2006.01)

(52) U.S. Cl.
  CPC .......... *G06F 9/5077* (2013.01); *G06F 3/0662* (2013.01); *G06F 9/45558* (2013.01); *G06F 17/30233* (2013.01); *G06F 2009/45562* (2013.01); *H04L 29/08846* (2013.01)

(58) Field of Classification Search
  CPC ............... G06F 9/45558; G06F 9/5077; G06F 17/30233; G06F 3/0662; G06F 2009/45562; H04L 29/08846
  See application file for complete search history.

(56) References Cited

U.S. PATENT DOCUMENTS

| | | |
|---|---|---|
| 4,862,349 A | 8/1989 | Foreman et al. |
| 2002/0049883 A1 | 4/2002 | Schneider et al. |
| 2006/0218544 A1 | 9/2006 | Chakraborty et al. |
| 2006/0248587 A1 | 11/2006 | Ray et al. |
| 2007/0168478 A1* | 7/2007 | Crosbie ............. G06F 8/63 709/221 |
| 2008/0082547 A1 | 4/2008 | Hwang et al. |
| 2008/0168188 A1* | 7/2008 | Yue .................. G06F 9/445 710/15 |
| 2009/0216828 A1 | 8/2009 | Gebhart et al. |
| 2009/0228629 A1 | 9/2009 | Gebhart et al. |
| 2009/0300605 A1 | 12/2009 | Edwards et al. |

(Continued)

*Primary Examiner* — Joshua Kading
(74) *Attorney, Agent, or Firm* — Fish & Richardson P.C.

(57) ABSTRACT

A method and system for migrating a plurality of physical desktop machines to a virtual desktop infrastructure is described. Physical machines are discovered on a computer network using at least one network search criteria using a tool module. User data is then gathered from the discovered physical machines. A virtual disk image file is created for each user of the discovered physical machines. The virtual disk image file contains user specific data collected from the discovered physical machines. A destination pool of virtual machines is selected and a virtual machine in the destination pool is configured for each of the users of the discovered physical machines. The configured virtual machines include an attached user data disk (UDD) backed by a corresponding virtual disk image file. A user can then remotely access their assigned configured virtual machines.

18 Claims, 3 Drawing Sheets

(56) References Cited

U.S. PATENT DOCUMENTS

| | | |
|---|---|---|
| 2009/0300607 A1 | 12/2009 | Ferris et al. |
| 2010/0070978 A1 | 3/2010 | Chawla et al. |
| 2010/0235831 A1 | 9/2010 | Dittmer |
| 2011/0107330 A1 | 5/2011 | Freundlich et al. |
| 2011/0107331 A1 | 5/2011 | Evans et al. |

* cited by examiner

MASS MIGRATION OF DESKTOP DEPLOYMENTS TO VIRTUAL DESKTOP INFRASTRUCTURES

RELATED APPLICATIONS

This application is a continuation application of U.S. application Ser. No. 12/945,507, filed Nov. 12, 2010, which is incorporated herein by reference in its entirety.

BACKGROUND

Companies, corporations, businesses, universities, and/or other persons may be interested in implementing desktop virtualization wherein, a personal computer desktop environment is separated from a physical machine through a client-server computing model. Current solutions to achieve desktop virtualization with existing infrastructures involve converting a physical personal computer to a virtual machine by copying and/or moving the entire content of the personal computer's hard drive to a centralized data repository, such as a data center.

Implementing such a solution involves copying and moving the contents of the user's entire personal computer hard drive including the user data, operating system data, irrelevant data and any other data that might be present on the personal computer's hard drive. For example, considering that a typical personal computer may contain multiple gigabytes of data, the current solution for desktop virtualization would involve copying the gigabytes of data to a central data center and creating a virtual machine (VM) based on the copied data. Such a solution is costly, time consuming, and laborious.

SUMMARY

A method and system for migrating a plurality of physical desktop machines to a virtual desktop infrastructure is disclosed. To perform the migration, physical machines are discovered on a computer network using at least one network search criteria using a tool module. User data is then gathered from the discovered physical machines. A virtual disk image file is created for each user of the discovered physical machines. The virtual disk image file contains user specific data collected from the discovered physical machines. A destination pool of virtual machines is selected and a virtual machine in the destination pool is configured for each of the users of the discovered physical machines. The configured virtual machines include an attached user data disk (UDD) backed by a corresponding virtual disk image file. A user can then remotely access their assigned configured virtual machines.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not a limitation in the figures of accompanying drawings, in which like references indicate similar elements and in which.

Figure 1:
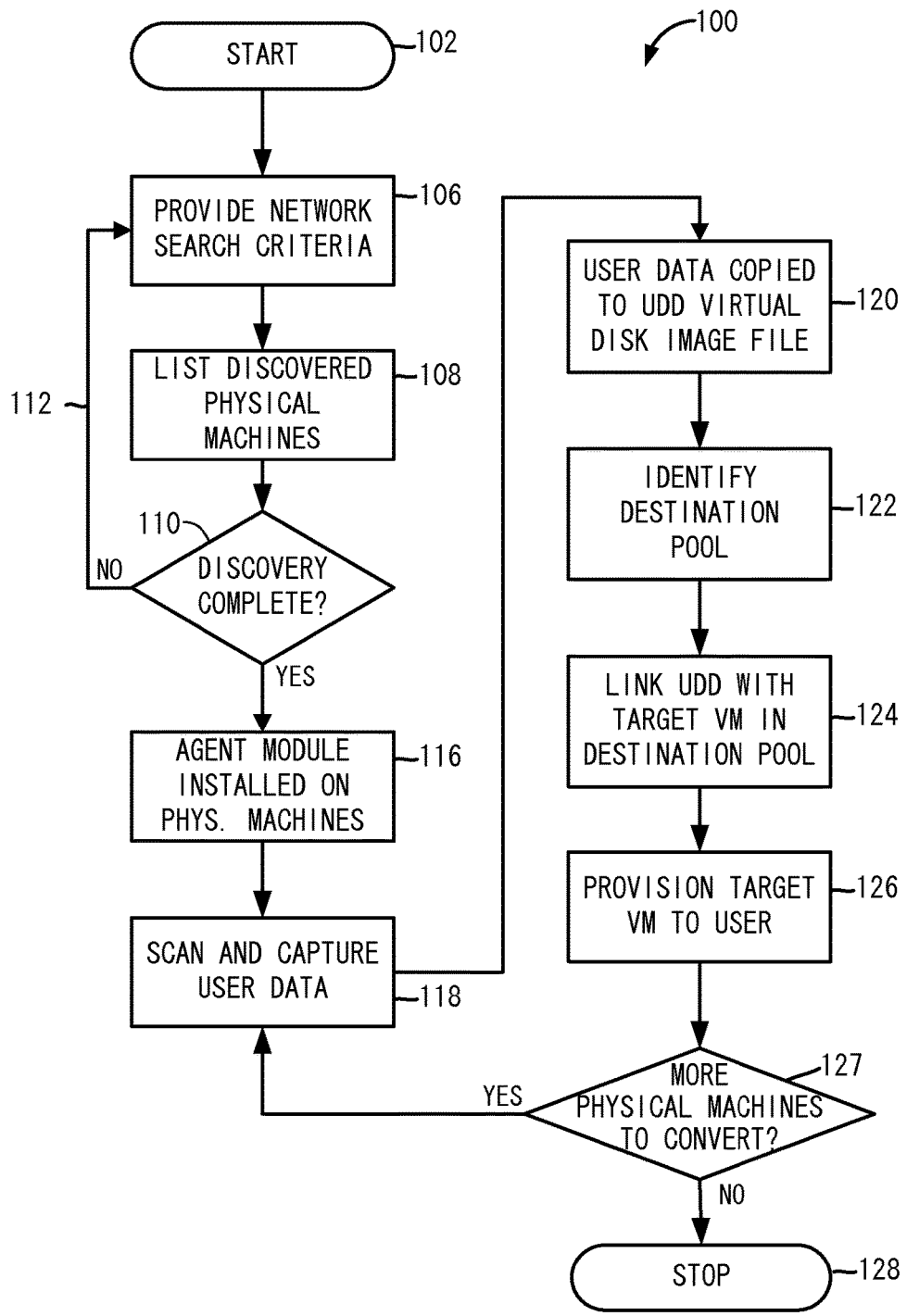
FIG. 1 is a flow chart illustrating to a work flow to migrate client devices to a view based virtual desktop infrastructure.

Other features of the present embodiments will be apparent from accompanying Drawings and from the Detailed Description that follows.

DETAILED DESCRIPTION

A method, system and an apparatus of mass migration of desktop deployments to virtual desktop infrastructures (VDI) is disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

In one or more embodiments, users (e.g., employees) in any entity may be categorized in terms of their job functions. Entities as described herein may include, but not limited to, an enterprise, corporation, business, and university. In one or more embodiments, the users of same category may be grouped into a department or grouped as a unit representing the job function of that entity. In departments that require computing devices, each of such departments may have specific system requirements such as hardware, operating systems, and software configurations based on the job function. For example, a software development department may require specific operating systems (e.g., Linux® operating system), one or more software, specific configurations of the physical machine and specifically configured desktop. In another example, an accounting department may require suitable operating systems (e.g., Microsoft® Windows® XP operating system), specific accounting operating system and specific configurations of the physical machines. The physical machine as described herein may therefore refer to a computing device having an operating system, applications, and user-specific data.

Entities may implement a virtualization technology, such as virtual desktop infrastructure (VDI) to efficiently manage computing resources. VDI is an infrastructure model in which a server is configured to host one or more VMs, which are then accessed remotely by users using thin clients or remote client software. However, for typical implementations, the VDI model requires complete virtualization of existing physical machines (e.g., including operating system). Presently described herein are exemplary methods for mass migration of desktop deployments to VDI without performing full physical-to-virtual ("P2V") migration. In one embodiment, a VDI deployment involves capturing non-operating system user data, storing the user data in a data center, and coupling the user data to a desktop VM (such as a linked-clone VM) as an ancillary user data disk. In this embodiment, the entire physical machine is not converted into a VM; only non-operating system user specific data is captured and coupled VM thereby reducing memory requirements in data centers. Although, non-operating system user data capturing is discussed herein, in one or more embodiments, other user data such as application data, settings data, configuration data can be captured as well.

As previously described, the entity may manage users in groups or departments. In one embodiment, while implementing virtualization for efficient management of the department, the entity may implement one or more "pools" of VMs, each pool being specific for each of the departments. The term "pool" refers to logical manageable group of similarly-configured VMs. Each pool may be run on a logical grouping or cluster of host machines (e.g., computer, server), processors, and storage devices (e.g., NAS or SAN datastores). Each VM in the pool may share a common master or parent disk image and a specific delta disk image associated with the VM. The disk images are stored in a common datastore accessible to all hosts associated with the pool. The delta disk image represents customizations or modifications to the master disk image. The master image, sometimes referred to as a "template," may include installed software useful for all the members (e.g., desktops or VMs) of the corresponding user pool.

A mass migration desktop virtualization server may be implemented for performing mass migration of desktop deployments to a VDI deployment. The mass migration desktop virtualization server may be configured to perform to mass migration of the desktop deployments to a VDI deployment based on one or more algorithms. An example work flow 100 to migrate client devices (e.g., physical desktop and virtual desktop machines) to VDI is illustrated in FIG. 1. The mass migration desktop virtualization server may include, inter alia, a tool module and an agent module. The tool module of the mass migration desktop virtualization server may be configured to identify and capture physical machines on a computer network to convert the physical machines to VMs. The agent module may be configured to extract user data (e.g., non-operating system user data) from the physical machines and to convert the extracted user data from a native format to a virtual machine disk format file.

Referring to FIG. 1, in step 102, a workflow to identify client devices for migration is initiated. In step 106, a network search criteria may be provided to the tool module 204 to discover the physical machines on a network to be converted into VMs. The network may include without limitation a Local Area Network (LAN), and a Wide Area Network (WAN). The network search criteria may be pre-configured or entered or selected by an administrator. In one or more embodiments, one or more target discovery algorithms are used by the tool module to discover physical machines to be migrated based on the criteria. The network search criteria may include without limitation designation of one or more organizational units, domains, network addresses, hosts, subnets, and/or Internet Protocol (IP) address ranges. In step 108, one or more physical machines discovered by the tool module 204 through the network is listed, i.e., displayed for an administrator. In step 110, a condition may be determined to check if all the desired physical machines are discovered in the network based on the network search criteria. The condition may be, for example, selection by the administrator to proceed based on the listed physical machines, or go back and modify the search criteria.

If all the physical machines matching the network search criteria in the network are not identified, then in step 112, searching operation may continued by repeating step 106. If all the physical machines matching to the network search criteria in the network are discovered at step 110, then the agent module is sent and installed on the discovered physical machines in step 116. Existing "push" technologies can be used for pushing the agent module to the discovered physical machines and installing the agent in an automated way.

In step 118, the agent module scans each of the physical machines to identify the relevant non-operating system user data and profile information of the user of the physical machine. Further, in one embodiment, in step 120, the identified relevant non-operating system user data in each of the physical machines may be captured and stored in to a virtual disk image file by the agent module. The virtual disk image file may be a file on centralized network storage, such as a NAS or SAN storage system, the file being a representation of a disk image, which is usable by virtualization software to back a virtual disk. That is, disk reads and writes executed to the virtual disk will be mapped to reads and writes of the virtual disk image file by virtualization software. The tool module and the agent module are further explained below with reference to FIG. 2. In one embodiment, an appropriate user 'tag' information may associated with the virtual machine disk image file and stored in a database and/or as metadata in the disk image file itself.

In step 122, a destination pool may be identified by the administrator for the mass migration desktop virtualization server. In one or more embodiments, the destination pool may be a newly created pool or an existing pool. The destination pool may include one or more similarly configured VMs. For example, a linked-clone may be generated for each of the physical machine based on a parent (VM) image in destination pool. A clone is a copy of a VM that is identical to another VM except that the clone has a unique identity, i.e., a unique globally unique identifier (GUID), SMSID, MAC address, etc. A linked clone is a thinly-provisioned clone that is linked to other clones by including delta disks linked to a common master disk image. In step 124, the virtual machine disk image file tagged with user profile information is coupled or attached to the corresponding linked-cloned associated to the user as a user data disk (UDD). This coupling or attaching is performed by appropriately configuring the virtual machine, typically by editing configuration files accessed by virtualization software when launching the VM. The user data disk is an ancillary disk, e.g., labeled "drive D:" for Windows implementations, that contains persistent user data and user profile information, the profile, which includes the user's customization settings. In one or more embodiments, the linked-clones may then be provisioned for users with their appropriate UDD and profiles. Further, in one embodiment, in step 126, once the conversion process and mass migration process of desktop deployment to virtual desktop infrastructure is completed, the user may be provided with a desktop (e.g., virtual) with the UDD. If more physical machines discovered in operation 108 have yet to be migrated to a VM, then the procedure returns to step 118 to scan a next physical computer for migration as provided in step 127. Otherwise, the mass migration process is completed in step 128.

Figure 2:
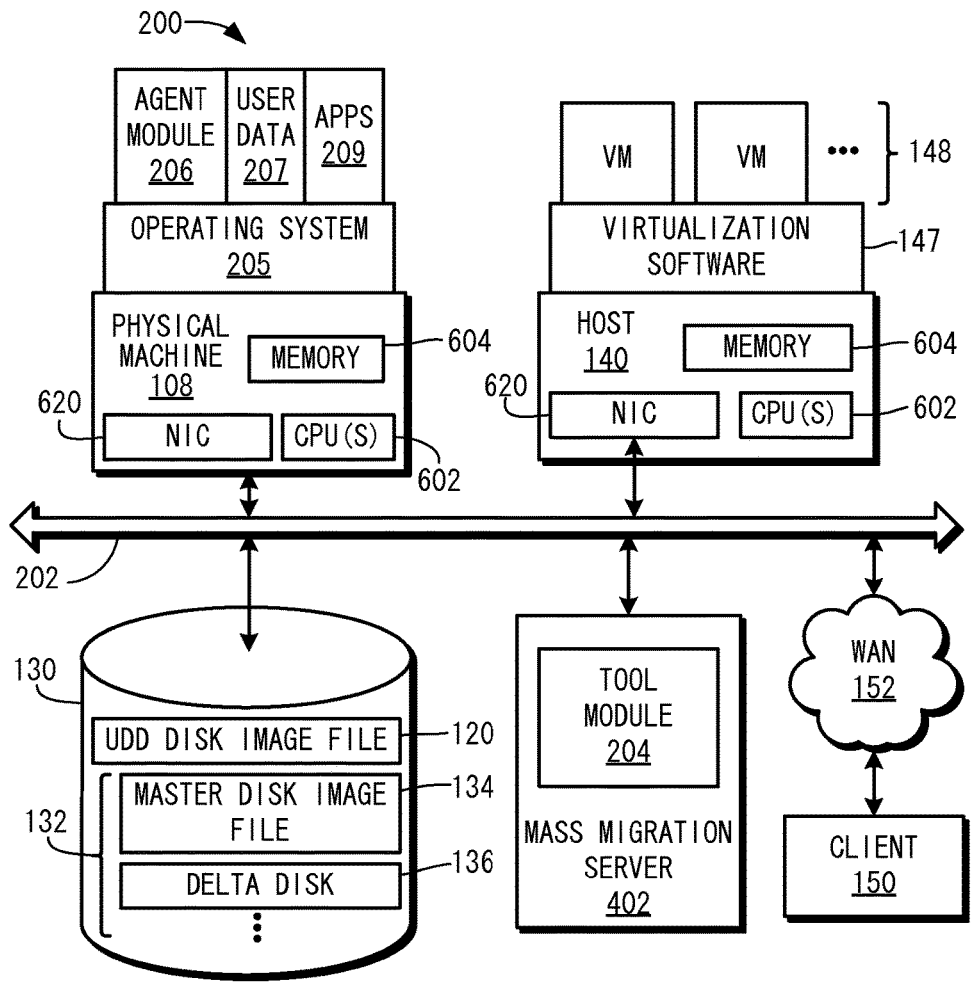
FIG. 2 is a network view illustrating generation of a virtual desktop infrastructure, according to one or more embodiments.

FIG. 2 shows network 200 illustrating the generation of a virtual desktop infrastructure, according to one or more embodiments. As described in FIG. 1, the tool module 204 of the mass migration desktop virtualization server 402 may be a stand-alone computer program running on server 402 or a component of virtualization infrastructure management software (not shown). Mass migration server 402 may be implemented as a physical server or a virtualized computer system such as one of VMs 148. Tool module 204 may be configured to search and identify physical machines 108 (only one shown) on network 202 to be converted into virtual machines. In one or more embodiments, tool module 204 may be configured to use network protocols such as a Simple Network Management Protocol (SNMP), Transmission Control Protocol/Internet Protocol (TCP/IP), etc. to search the physical machines on the computer network 202. Alternatively, existing physical computers may be identified using a directory service such as LDAP or Active Directory. In one or more embodiments, tool module 204 may also be provided with, e.g., by a network administrator, network search criteria for discovering target physical machines on the computer network 202. The search criteria may be provided by an administrator of the mass migration desktop virtualization server.

Physical machine 108 includes an operating system 205, such as a Microsoft Windows® operating system, which resides on memory 604 of physical machine 108 but is shown conceptually in FIG. 2 as being installed "on top of" physical machine 108. Also stored in memory 604 of physical machine 108 are user applications ("APPS") 209 user data 207, and Agent module 206. In one or more embodiments, agent module 206 may be automatically implemented (e.g., installed) in each of the discovered virtual physical machines 108 by or on behalf of mass migration server 402 using existing application "push" technologies. In one embodiment, agent module 206 is configured to scan the physical machine 108 on which agent module 206 is installed. The scanning process may include identification of non-operating system user data 207, which includes profile information, configuration and setting data, application data, etc. Agent module 206 then extracts relevant non-operating system user data 206 from the physical machines and stores this data on a virtual disk image file ("UDD DISK IMAGE FILE") 120.

A destination pool comprises a logical collection of VMs 148, which may reside on a single host platform 148 or a plurality of hosts (only one shown) attached to network 202. Each VM 148 in the pool has a main virtual disk image 132 that is defined by master disk image file 134 and one of delta disks 136 (only one shown). The main disk image 132 contains operating system and application files, and for Windows systems, is ordinarily designated "drive C:". Each delta disk file 136 may be specific to each user and defines differences from the master disk image that are specific to the particular user. All writes by a user's VM are directed to the delta disk file. In addition, each VM 148 has a secondary UDD 120 that may be configured as the user's "drive D:" that stores that user's profile information and data extracted from the corresponding physical machine 108. In some embodiments, in an enterprise, there may be multiple pools wherein each pool in the enterprise is configured based on job functions or system requirements of the users of that pool and have a corresponding master disk image file 134.

The virtual disk image file 120 generated from a particular physical system (such as physical machine 108) may be tagged with an appropriate user tag. For example, the user tag may simply associate the virtual disk image file 120 with the user from whose account on the physical machine 108 user data 207 was extracted. Similarly, virtual disk image files of other physical systems may each be stored in common datastore 130 that is associated with the desktop pool and tagged with corresponding user tags. When a user accessing client 150 connects to his or her VM 148, virtualization software 147 will create the virtual disks for VM 148 using virtual disk image files in data store 130 based, in one embodiment, on the tagging information stored in a database or VM configuration files (not shown).

Host 140 and physical machine 108 may each be general-purpose computing platforms that as such include one or more processors 602, main memory 604, and a network interface device 620. Memory 604 may include a plurality of memories, including persistent (e.g., disk), volatile (RAM), and cache memories. As generally known, such general-purpose computing platforms include various interconnects and components that are not shown. Mass migration server 402 may be implemented as a physical computer system or a virtual machine such as one of VMs 148. Software running mass migration server 402 may reside in local memory storage, e.g., a machine readable medium, or in centralized storage such as datastore 130.

Mass migration desktop virtualization server 402 may include all necessary software required for performing physical-to-virtual desktop migration. The software may provide a user interface such as a Graphical User Interface (GUI), a Command Line Interface (CLI) or any suitable user interface to enable the administrator to perform administrative and management tasks as described herein.

In one or more embodiments, the mass migration desktop virtualization server 402 may be configured to maintain communication with the agent module 206 in each of the physical machines through network 202. As the virtual machine disks and the virtual disk image files are generated and stored as UDD disk image files 120 in datastore 130 by agent module 206, the mass migration desktop virtualization server 402 generates a linked-clone VM based on master disk image file 120 for every user. Mass migration desktop virtualization server 402 couples each of the virtual machine disks as the UDD's to corresponding linked-clone VMs associated with the user.

The UDD disk image file 120 may include non-operating system user data as well as other data such as computing environment data, settings data and application data (collectively, "user data"), which may be captured and converted into the virtual disk image file. Also, the computing environment, the settings data and application data may be applied in the desktop (linked-clone VM) when user logs-in to access their VM from client 150, which may be any physical system or device. By capturing only non-operating system user data, memory consumption at the data center may be reduced and efficiently managed. Also, the operating system data may be retained on the physical machine without converting to the virtual machine. Since only user data is captured, any change in operating system would not affect the performance of the desktop as only the non-operating system user data is captured and stored to be linked with the operating system. That is, physical machine 108 and VMs 148 may have differing operating systems or operating system versions. Thus, the system described herein is agnostic to the operating system on the discovered physical machines without losing user data.

Figure 3:
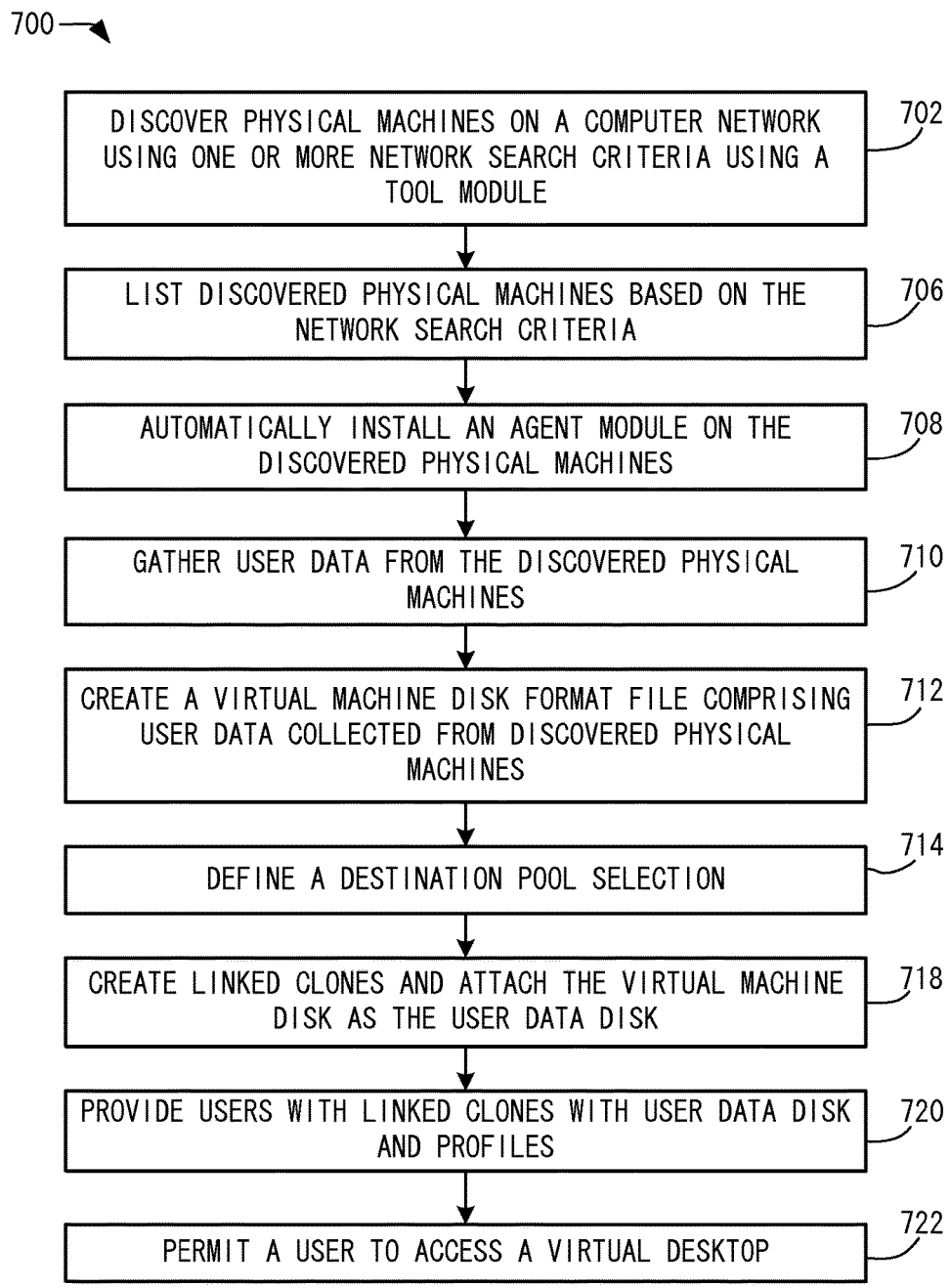
FIG. 3 is a process flow of implementing VDI through a mass migration of desktop deployments to virtual desktop infrastructures, according to one or more embodiments.

FIG. 3 shows by way of example a process flow 700 of implementing a VDI deployment through a mass migration of physical to virtual desktop deployments. In operation 702, one or more physical machines on a computer network 202 may be discovered using search criteria through tool module 204 of the mass migration virtualization server 402 (e.g., as illustrated in FIG. 2). The search criteria may include selection of a target discovery algorithm. In operation 706, discovered physical machines based on the network search criteria may be listed. In operation 708, the agent module 206 of the mass migration virtualization server 402 may be automatically installed on the discovered physical machines. In operation 710, user data may be gathered from the discovered physical machines. In operation 712, a virtual disk image file may be generated. Each generated virtual disk image file includes user data collected from a corresponding one of the discovered physical machines. In operation 714, a destination pool selection may be defined through the mass migration virtualization server 402. In operation 718, linked-clones may be generated and the virtual disk image file is attached as the user data disk. In operation 720, the users may be provided with the linked clones with user data disk and profiles. In operation 722, the users may be permitted to access the virtual desktop from a remote client.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
using specified network search criteria to identify a plurality of physical machines on a computer network, wherein each physical machine is associated with a corresponding desktop of a particular user of the physical machine;
providing an agent module for installation on each of the identified plurality of physical machines, wherein each agent identifies non-operating system user data for each particular user of the plurality of physical machines and generates a respective virtual disk image file for the identified non-operating system user data for each particular user;
determining a destination pool, the destination pool comprising a plurality of virtual machines, wherein each virtual machine has a main virtual disk image that contains operating system and application files;
for each main virtual disk image, coupling the virtual disk image file to a respective virtual machine of the plurality of virtual machines as a user data disk, wherein the virtual disk image file is an ancillary disk for the virtual machine; and
permitting each user to remotely access a virtual desktop generated by the particular virtual machine coupled to the user data disk of the user.

2. The method of claim 1, wherein the virtual disk image file for each particular user is stored in a central storage of the computer network, and wherein each of the virtual disk image files is tagged with information identifying the particular user.

3. The method of claim 1, wherein coupling a particular virtual disk image file to a corresponding virtual machine comprises editing configuration files accessed by virtualization software when launching the virtual machine.

4. The method of claim 1, wherein the virtual machine for a particular user is provisioned with user profile information including user customization settings.

5. The method of claim 1, wherein the main virtual disk image further includes one or more delta disks to which writes by the virtual machine are directed.

6. The method of claim 1, wherein identifying the plurality of physical machines comprises:
displaying a list of the identified physical machines to an administrator; and
receiving an acceptance from an administrator before installing the agent module on the identified physical machines.

7. A system comprising:
one or more computers including one or more processors and one or more memories, the one or more computers configured to perform operations comprising:
using specified network search criteria to identify a plurality of physical machines on a computer network, wherein each physical machine is associated with a corresponding desktop of a particular user of the physical machine;
providing an agent module for installation on each of the identified plurality of physical machines, wherein each agent identifies non-operating system user data for each particular user of the plurality of physical machines and generates a respective virtual disk image file for the identified non-operating system user data for each particular user;
determining a destination pool, the destination pool comprising a plurality of virtual machines, wherein each virtual machine has a main virtual disk image that contains operating system and application files;
for each main virtual disk image, coupling the virtual disk image file to a respective virtual machine of the plurality of virtual machines as a user data disk, wherein the virtual disk image file is an ancillary disk for the virtual machine; and
permitting each user to remotely access the virtual desktop generated by the particular virtual machine coupled to the user data disk of the user.

8. The system of claim 7, wherein the virtual disk image file for each particular user is stored in a central storage of the computer network, and wherein each of the virtual disk image files is tagged with information identifying the particular user.

9. The system of claim 7, wherein coupling a particular virtual disk image file to a corresponding virtual machine comprises editing configuration files accessed by virtualization software when launching the virtual machine.

10. The system of claim 7, wherein the virtual machine for a particular user is provisioned with user profile information including user customization settings.

11. The system of claim 7, wherein the main virtual disk image further includes one or more delta disks to which writes by the virtual machine are directed.

12. The system of claim 7, wherein identifying the plurality of physical machines comprises:
displaying a list of the identified physical machines to an administrator; and
receiving an acceptance from an administrator before installing the agent module on the identified physical machines.

13. One or more non-transitory machine readable media the media embodying computer instructions causing a processor to perform operations comprising:
using specified network search criteria to identify a plurality of physical machines on a computer network, wherein each physical machine is associated with a corresponding desktop of a particular user of the physical machine;
providing an agent module for installation on each of the identified plurality of physical machines, wherein each agent identifies non-operating system user data for each particular user of the plurality of physical machines and generates a respective virtual disk image file for the identified non-operating system user data for each particular user;
determining a destination pool, the destination pool comprising a plurality of virtual machines, wherein each virtual machine has a main virtual disk image that contains operating system and application files;
for each main virtual disk image, coupling the virtual disk image file to a respective virtual machine of the plurality of virtual machines as a user data disk, wherein the virtual disk image file is an ancillary disk for the virtual machine; and
permitting each user to remotely access the virtual desktop generated by the particular virtual machine coupled to the user data disk of the user.

14. The one or more machine readable media of claim 13, wherein the virtual disk image file for each particular user is stored in a central storage of the computer network, and wherein each of the virtual disk image files is tagged with information identifying the particular user.

15. The one or more machine readable media of claim 13, wherein coupling a particular virtual disk image file to a corresponding virtual machine comprises editing configuration files accessed by virtualization software when launching the virtual machine.

16. The one or more machine readable media of claim 13, wherein the virtual machine for a particular user is provisioned with user profile information including user customization settings.

17. The one or more machine readable media of claim 13, wherein the main virtual disk image further includes one or more delta disks to which writes by the virtual machine are directed.

18. The one or more machine readable media of claim 13, wherein identifying the plurality of physical machines comprises:
displaying a list of the identified physical machines to an administrator; and
receiving an acceptance from an administrator before installing the agent module on the identified physical machines.

* * * * *